United States Patent [19]
Albers et al.

[11] Patent Number: 5,434,670
[45] Date of Patent: Jul. 18, 1995

[54] LASER GYRO SCREENING METHOD FOR PREDICTING ANGULAR RANDOM WALK

[75] Inventors: Steven C. Albers, Shoreview; Timothy J. Callaghan, Roseville, both of Minn.

[73] Assignee: Honeywell Inc., Minneapolis, Minn.

[21] Appl. No.: 160,014

[22] Filed: Nov. 30, 1993

[51] Int. Cl.$^6$ ............................................. G01C 19/66
[52] U.S. Cl. .................................................. 356/350
[58] Field of Search ......................................... 356/350

[56] References Cited

U.S. PATENT DOCUMENTS 4,844,615  7/1989  Benoist ................................. 356/350

Primary Examiner—Vincent P. McGraw
Attorney, Agent, or Firm—Craig J. Lervick

[57] ABSTRACT

A screening method for a ring laser gyro capable of more accurately predicting the gyro's angular random walk upon completion of the built process is disclosed. A strong correlation exists between the angular random walk and a scale factor pulling term. Scale factor pulling is equivalent to the scale factor deviation measured at two rotational rates plus a positive scale factor correction term and is indicative of the effect of lockin on the scale factor. This screening method allows the removal of high ARW units from the production line at a point early on in their processing. By removing these gyros at this point in processing, unnecessary production steps and unnecessary value added operations are eliminated.

16 Claims, 2 Drawing Sheets

LASER GYRO SCREENING METHOD FOR PREDICTING ANGULAR RANDOM WALK

FIELD OF THE INVENTION

The present invention relates to a method of screening a ring laser gyroscope at a point early in its production in order to predict its eventual performance. More specifically, the invention relates to a screening method for predicting the angular random walk of a ring laser gyroscope.

BACKGROUND OF THE INVENTION

The ting laser gyroscope is a well known device used for measuring inertial rotation. Primarily, the ring laser gyroscope (RLG) is used in navigation systems for aircraft, missiles, etc. In summary, the RLG utilizes two counterpropagating light beams which resonate in a planar closed loop path. Rotation about an axis normal to the plane containing the two counterpropagating light beams causes a difference in the effective pathlength of these light beams. Change in the effective pathlength results in a separation of the resonant frequencies of the two counterpropagating light beams. This frequency shift is a direct indication of the rue of rotation to which the RLG is subjected. Ring laser gyroscopes are more specifically described in U.S. Pat. Nos. 3,373,650 to Killpatrick and 3,390,606 to Podgorski.

As will be recognized by those skilled in the art, the ring laser gyroscope is a very complex device made up of a number of different elements and control systems, all working in conjunction with one another. As a result of the complexity of the ring laser gyro, the cost of production can be somewhat substantial. Efforts are continuously undertaken to reduce this production cost. One method of reducing production costs is to attempt to identify performance characteristics of the ring laser gyro at a point early in its production. By predicting performance characteristics with some degrees of accuracy, units with poor performance characteristics can be removed from the production line, thus eliminating the cost and time required to further process these units. When a unit having bad performance characteristics is identified early during the production process, efforts can be made to improve the performance of this gyro or the unit can be scrapped, thus avoiding further value added steps (extensive testing and processing). Furthermore, early identification of performance characteristics can identify potential problems in the production line and efforts can be made a an early point in time to correct these problems.

One performance characteristic which is crucial to the ring laser gyroscope is the angular random walk (ARW). Angular random walk identifies the stability of the ring laser gyroscope. When incorporated into a navigation system it is important that the ring laser gyroscope only produce signals which are indicative of actual rotation. If the gyroscope is unstable, the possibility of producing erroneous rotation signals is created.

Previously a relationship between a gyro's angular random walk and the gyro's lockin was identified. Due to this relationship, predictions of the angular random walk of a gyroscope were made based on a traditional lockin measurement.

Lockin is a phenomena which is well known in the art wherein the two counterpropagating light beams resonate together or "lockin" at low rotation rates. This lockin characteristic affects many characteristics of the ring laser gyroscope. One specific effect is the non-linearity of the gyro's scale factor of the ring laser gyroscope at very low rates.

While the traditional measurement of lockin did provide a method for predicting angular random walk, this method was not the most accurate. A correlation between the traditional lockin measurement and ARW did exist; however, this was not a strong correlation. Consequently, using the traditional lockin measurement to predict ARW occasionally resulted in the further processing of ring laser gyroscopes which did not perform to the necessary specifications. Referring now to FIG. 1, there is shown a graph which plots the lockin measurement versus subsequent calibrated ARW measurements. The data points are plotted as dots 12 whereas a best fit line 14 is also plotted. As can be seen from FIG. 1 the correlation between the data points and the best fit line is somewhat weak.

Lastly, the previous test used to determine lockin was time consuming and somewhat inaccurate. To test for lockin, the RLG was placed on a rate table and the optical signals within the block were monitored. The table was rotated at a rate known to be above the RLG's lockin rate. Next, the rate at which the table is rotated is decreased to the point at which the two optical signals no longer maintain their independence. This test required close monitoring by a technician which is tedious, costly and time consuming.

SUMMARY OF THE INVENTION

It is the object of the present invention to provide a method of screening a ring laser gyroscope to predict its performance characteristics. It is a further object of the present invention to provide a method for predicting a ring laser gyroscope's angular random walk (ARW).

It is another object of the present invention to provide a screening method which is capable of predicting performance characteristics at a point early in the production and processing of the ring laser gyroscope, thus eliminating further processing of poorly performing gyroscopes. Elimination of the processing and testing of poorly performing gyroscopes will help to reduce the overall cost of production.

Lastly, it is an object of the present invention to provide a ring laser gyro screening method which exploits the relationships between a ring laser gyro's angular random walk and the scale factor pulling due to the low rate lockin phenomena. Exploiting this relation provides a method to easily screen gyroscopes for performance requirements at an early point in processing.

A strong correlation has been identified between a ring laser gyro's angular random walk and its scale factor pulling measurement. Scale factor pulling is a determination of a gyro's scale factor deviation due to lockin effects. The present method of screening recognizes a correlation between ARW and the lockin phenomena; however, does not utilize the traditional lockin measurement.

A method is shown in which scale factor pulling is determined at a point fairly early in the processing of the ring laser gyroscope. Furthermore, the testing and calculations to determine scale factor pulling is fairly straightforward and fairly quick. Having tested for scale factor pulling a gyroscope's angular random walk can then be easily predicted. Based on this predicted angular random walk, decisions can be made regarding the disposition of the ring laser gyro at this point in its production. If angular random walk appears to be favorable, processing of the RLG can continue, however if the predicted angular random walk appears to be unfavorable the gyro can be torn down and salvaged or reworked at this point. The ability to accurately predict angular random walk at a point early in its processing provides for a substantial cost savings as well as a very valuable production control.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

Figure 1:
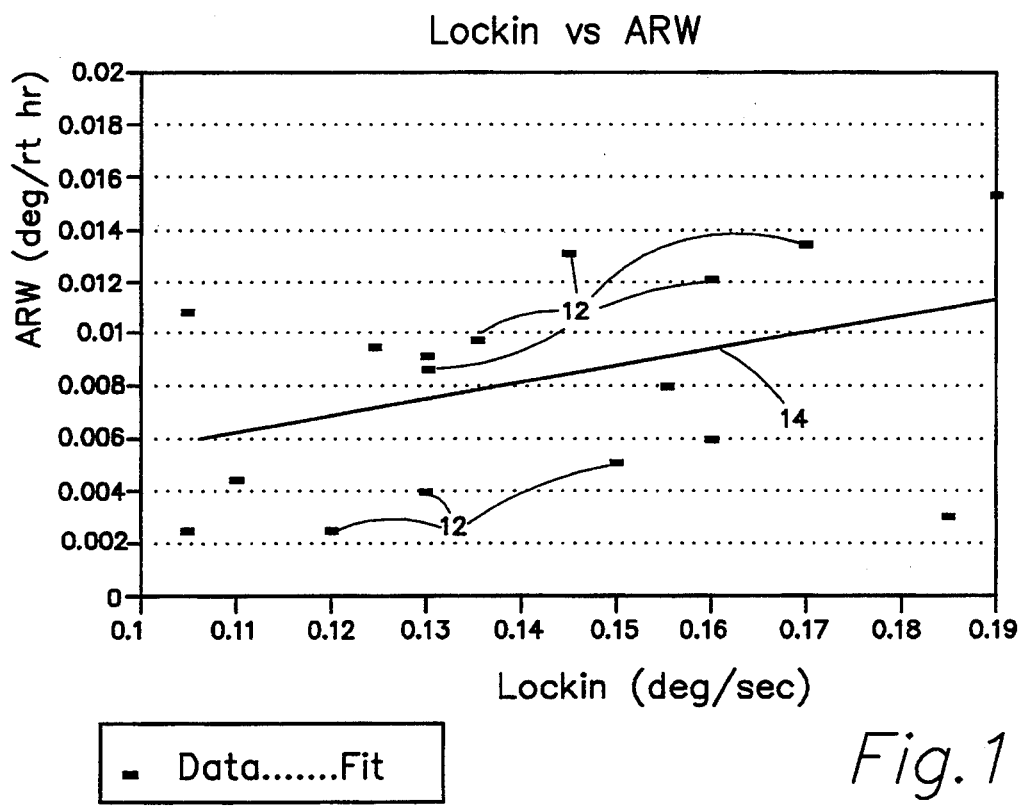
FIG. 1 is a graph illustrating the relationship between the traditional lockin measurement and angular random walk.

An improved screening test has been developed for the ring laser gyroscope which is capable of more accurately predicting angular random walk. This screening test is performed at the block level and, therefore, is done fairly early on in the processing and production of the ring laser gyroscope. Early testing allows for the removal of potentially high ARW units from the production line. This ability to screen units based on accurately predicted performance characteristics provides a substantial cost savings in that the scrapping, rework and value added operations performed on potentially high ARW units are eliminated.

Over the past years RLG scale factor equations have been studied extensively. Empirical and theoretical models have been developed. The model (shown below) predicts that the lockin reduces the scale factor when the input rate is decreased. Unfortunately, calculating the $\Omega_{lockin}$ or predicting gyro performance is not as simple as measuring the scale deviation between two input rates. The positive scale factor correction term needs to be accounted for since it also influences the scale factor deviation.

One scale factor model, the Warner Egli Scale Factor Empirical Model modified by Lim-Aronowitz states:

$$SF = SF(\infty) * \underbrace{(1 + (0.5 * \Omega_s^2)/(\Omega_{input}^2 + \Omega_g^2))}_{\text{Positive scale factor term}} * \underbrace{\sqrt{1 - (\Omega_{lockin}/\Omega_{input})^2}}_{\text{Lockin term}}$$

Where:
SF is the Scale Factor Measured at any input rate
SF ($\infty$) is the scale factor at very large input rates
$\Omega_s^2$ is a mirror scatter dependent term
$\Omega_g^2$ is an excessive cavity gain term
$\Omega_{input}$ is the input rate
$\Omega_{lockin}$ is a beam coupling dependent term It has been shown that a gyro's ARW is closely related to the above shown lockin term ($\Omega_{lockin}$). By testing to determine the effects of $\Omega_{lockin}$, the ARW can then be predicted.

According to the data presented, the positive scale correction term reduces when the excessive gain term ($\Omega_g$ shown below) increases. Therefore, in order to reduce the effects of the positive scale correction term the screening test is conducted while $\Omega_g$ is caused to be constant.

By forcing the gain term ($\Omega_g$) to be a constant, the positive scale factor term can be compensated for by estimating $\Omega_s^2$. A linear correlation has been established between $\Omega_s^2$ and $SBS^2$. Therefore, $\Omega_s^2$ can be estimated by measuring the amplitude of the single beam signal (SBS).

The positive scale factor compensation model developed is:

Positive SF term compensation
(counts/deg)=0.0174*$SBS^2$

The effects of lockin on the scale factor model have been extensively investigated. Examining the scale factor at two different input rates can help to see the effects of lockin on the scale factor model. Since the positive scale factor term can be compensated by measuring the SBS, any deviation in scale factor must be primarily due to the lockin term. However, the deviation should still be compensated for the positive scale factor term. Scale factor pulling, due to lockin effects, is then defined as:

SF Pulling=$SF(\Omega_1)-SF(\Omega_2)+0.0174*SBS^2_{ave}$.

Where:
SF($\Omega_1$)=measured scale factor at a first rate, $\Omega$;
SF($\Omega_2$)=measured scale factor at a second rate, $\Omega_2$ (note that $\Omega_2$ is less then $\Omega_1$); and
$SBS_{ave}$=average measured SBS during test.

A data set was accumulated, consisting of the time of strobe, gyro counts, SBS amplitude and other gyro monitors. Two revolutions of data were collected at both two input rates which are slightly above the traditional lockin rate. This data was used to study the effects of the lockin term.

The data was then reduced by averaging the data set over the two revolutions of data. The gyro counts were corrected for earth rate by subtracting 2.39 counts/seconds from the average value. The scale factor was determined by dividing the average counts by 24. The scale deviation was determined by subtracting the low rate SF (2.9 deg/sec) from the high rate SF (9.9 deg/sec) and adding the positive scale correction term. The positive scale correction term was calculated by multiplying the square of the SBS times 0.0174.

The positive scale factor correction term is compensated for by measuring the amplitude of the single beam signal. It was discovered that the correlation between ARW and scale deviation is five times better than ARW to traditionally measured lockin. (Note: +-test results from traditional lockin test were approximately 1.7, whereas +-test results comparing ARW to SF pulling were approximately 7.1.) This improved ARW screening test can be used to eliminate unnecessary value added operations; performed on high ARW units.

Figure 2:
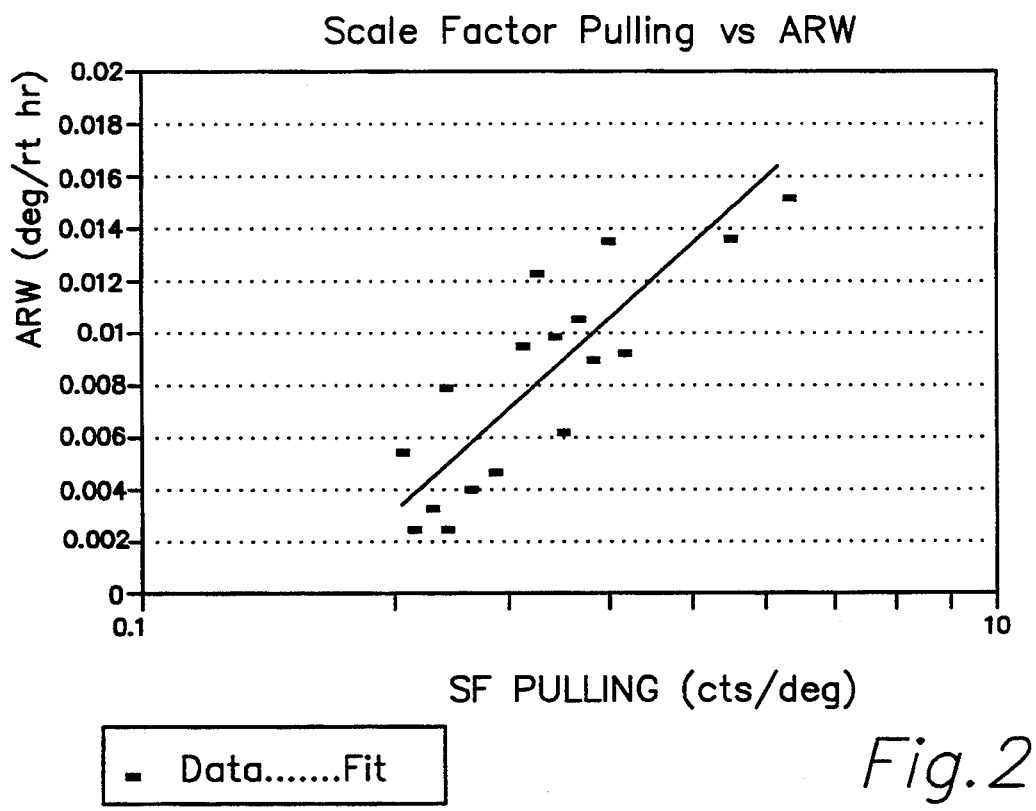
FIG. 2 is a graph illustrating the relationship between "scale factor pulling" and angular random walk.

The data illustrated in FIG. 2 shows the strong correlation between scale factor pulling and angular random walk. Therefore by measuring the scale factor pulling, angular random walk can be accurately predicted.

Figure 3:
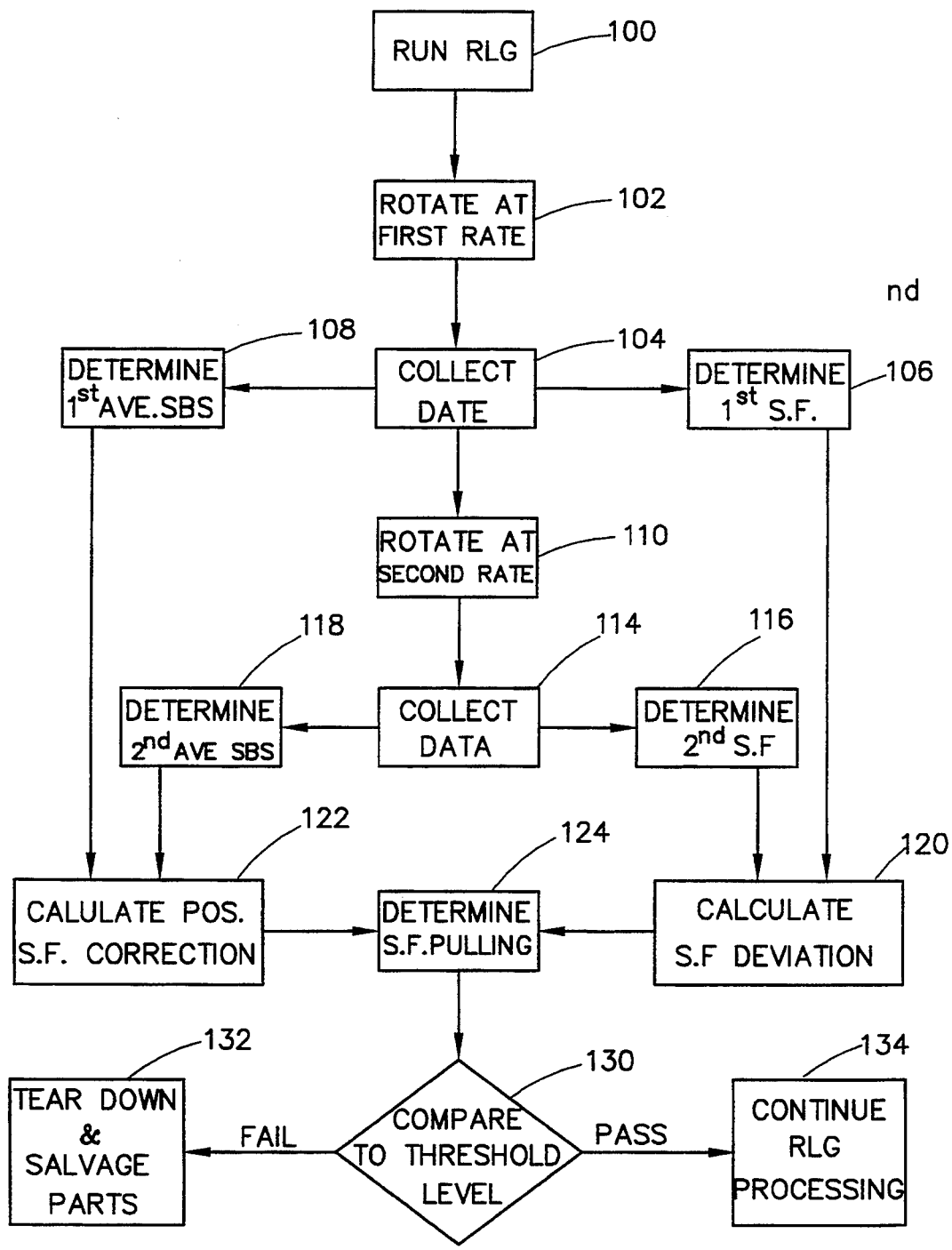
FIG. 3 is a flow diagram illustrating a process of screening ring laser gyros to predict angular random walk.

Referring now to FIG. 3, there is shown a flow chart of the method used to calculate scale factor pulling and thus predict angular random walk. At step 100 the ring laser gyro is energized or run. This includes the creation of a gas discharge laser within the ring laser gyroscope which operates at a constant discharge current. Furthermore, the path length control and random drift improvement controls are implemented. As will be recognized by those skilled in the art the PLC control includes a control loop which maintains the dimensions of ring laser gyro cavity at a desired point. Next, the ring laser gyro is rotated at a first rate at block 102. In the preferred embodiment, this rate is equal to approximately 9.9 degrees per second. While the ring laser gyroscope is rotating at this first rate, data is collected in block 104. In the preferred embodiment two revolutions of data are gathered. The collected data includes the output counts provided by the ring laser gyroscope which are indicative of rotation, the monitored SBS or single beam signal, and the strobe signal from a rate table for indicating actual rotation. From this data a first scale factor is determined at box 106. Similarly a first average SBS is determined at 108.

Next, at step 110 the ring laser gyro is rotated at a second rate. While the rate of rotation is not crucial, in the preferred embodiment this second rate is approximately 2.9 degrees per second. Again, in block 114 data is collected including output counts, the rate table strobe, and the single beam signal. This data is collected over two revolutions of the gyroscope. From this data a second scale factor can be determined in block 116. Similarly, a second average SBS value can be determined in block 118. As previously stated, the rate of rotation is not crucial; however, it is preferred that one rate be sufficiently high so as to be substantially free of lockin effects, whereas the second rate be somewhat lower so as to contain the lockin effects.

Now it is necessary to perform calculations for determining the scale factor pulling. The first scale factor determined in box 106 and the second scale factor determined in box 116 are then processed to determine the scale factor deviation in block 120. This scale factor deviation is equivalent to the first scale factor minus the second scale factor.

Concurrently, the first average SBS from block 108 and the second average SBS from block 118 are provided to block 122 for purposes of calculating the positive scale factor correction term. Now scale factor deviation, as calculated in block 120, and positive scale factor correction term, as calculated in block 122, are used to determine the scale factor pulling in block 124. Scale factor pulling is determined by combining the positive scale factor correction term and the scale factor deviation terms.

Therefore the complete model used to determine the scale factor pulling that is due to lockin in the GG1320 is shown below:

$$SF \text{ pulling (cts/deg)} = SF(9.9°/s) - SF(2.9°/s) + 0.0174 * SB\text{-}S^2_{ave}$$

Now that the scale factor pulling value has been determined in block 124, a comparison can be made between scale factor pulling value and a predetermined threshold value in block 130. As was shown in FIG. 2 the scale factor pulling term is very closely correlated with the angular random walk. Therefore any gyros having a scale factor pulling term that is unnecessarily high can be rejected thus causing them to be torn down and salvaged. This consequence is shown in block 132 of FIG. 3. Similarly, gyros that pass this comparison of block 130 are continued to be processed as shown in block 134.

The screening test previously described is the preferred method of predicting ARW; however, it may be possible to obtain useful data using variations of this test. For example, by simply measuring the scale factor deviation and not compensating using the SBS signal, data can be obtained which is indicative of ARW. Utilizing this technique, the correlation between predicted ARW and scale factor deviation is not as high and, therefore, less confidence can be placed on the predicted ARW.

Having described the present invention in considerable detail, it should be apparent to those skilled in the art that the invention can be modified in arrangement and detail without departing from the principles of the invention. We claim all modifications coming within the scope and spirit of the following claims.

What is claimed is:

1. A method of predicting performance of a ring laser gyroscope, comprising the steps of:
    rotating the gyro at a first rate and monitoring a gyroscope output to obtain a first rate output signal and monitoring a rate table output to obtain a first table output signal;
    rotating the gyro at a second rate and monitoring the gyroscope output to obtain a second rate output signal and monitoring the rate table output to obtain a second table output signal wherein the second rate is lower than the first rate;
    determining a first gyro scale factor based upon the first rate output signal and the first table output signal;
    determining a second gyro scale factor based upon the second rate output signal and the second table output signal;
    calculating a scale factor deviation based upon the first gyro scale factor and the second gyro scale factor; and
    predicting the gyro's performance based upon a known relationship between the scale factor deviation and the gyro's performance.

2. The method of claim 1 wherein the first rate is approximately nine and nine-tenths (9.9) degrees per second.

3. The method of claim 1 wherein the second rate is approximately two and nine-tenths (2.9) degrees per second.

4. The method of claim 1 further comprising the steps of:
    monitoring a single beam signal output while the gyroscope is being rotated at the first rate to obtain a first single beam signal;
    monitoring the single beam signal output while the gyroscope is being rotated at the second rate to obtain a second single beam signal;
    determining an average single beam signal based upon the first single beam signal and the second single beam signal;
    determining a scale factor pulling value based upon the scale factor deviation and the average single beam signal; and
    predicting the angular random walk of the gyroscope based upon the scale factor pulling value.

5. The method of claim 1 wherein the scale factor deviation is equal to the difference between the first scale factor and the second scale factor.

6. The method of claim 4 wherein the scale factor pulling value is equal to the square of the average single beam signal times a constant plus the scale factor deviation value.

7. The method of claim 1 further comprising the step of running the ring laser gyroscope at a constant discharge current.

8. A method of predicting a ring laser gyroscope's performance, the gyroscope having an output which produces counts when rotated, the method comprising the steps of:
   running the gyroscope at a constant discharge current;
   rotating the gyroscope at a first rate and monitoring the gyroscope output;
   determining a first scale factor based upon the gyroscope output at the first rate;
   rotating the gyroscope at a second rate, the second rate being lower than the first rate, and monitoring the gyroscope output;
   determining a second scale factor based upon the gyroscope output at the second rate;
   determining the scale factor deviation by calculating the difference between the first scale factor and the second scale factor; and
   predicting the gyroscope's performance based upon the scale factor deviation.

9. The method of claim 8 wherein the first rate is approximately nine and nine-tenths (9.9) degrees per second.

10. The method of claim 8 wherein the second rate is approximately two and nine-tenths (2.9) degrees per second.

11. The method of claim 8 further comprising the step of monitoring the rate table to determine a first measured rate of rotation and a second measured rate of rotation and then using these measured rates to determine the first scale factor and the second scale factor.

12. The method of claim 8 wherein the ring laser gyroscope has a single beams signal output, the method further comprising the steps of:
   monitoring the single beam signal output during the rotation at the first rate to obtain a first SBS value;
   monitoring the single beam signal output during the rotation at the second rate to obtain a second SBS value;
   calculating an average SBS value based on the first SBS value and the second SBS value;
   calculating a scale factor pulling value based upon the average SBS value and the scale factor deviation; and
   predicting the gyroscope's angular random walk based upon the scale factor pulling value.

13. The method of claim 12 wherein the scale factor pulling value is equal to the square of the average single beam signal times a constant plus the scale factor deviation value.

14. A method of screening ring laser gyroscopes to predict the gyro's angular random walk, the method comprising the steps of:
   running the ring laser gyroscope at a constant discharge current;
   rotating the ring laser gyroscope at a first rate and monitoring the counts and single beam signal so as to determine a first average single beam signal and a first scale factor;
   rotating the ring laser gyroscope at a second rate, the second rate being lower than the first rate, and monitoring the counts and single beam signal so as to determine a second average single beam signal and a second scale factor;
   determining a scale factor deviation value which is equivalent to the difference between the first scale factor and the second scale factor;
   determining a scale factor compensation value which is equivalent to the average of the first average single beam signal and the second average single beam signal;
   determining a scale factor pulling term by subtracting the scale factor compensation value from the scale factor deviation value; and
   comparing the scale factor pulling term with a predetermined threshold value and passing the ring laser gyroscope if the scale factor pulling term is below the predetermined threshold value.

15. The method of claim 14 wherein the first rate is approximately nine and nine-tenths (9.9) degrees per second.

16. The method of claim 14 wherein the second rate is approximately two and nine-tenths (2.9) degrees per second.

* * * * *